United States Patent [19]

Farmer

[11] Patent Number: 4,519,548
[45] Date of Patent: May 28, 1985

[54] INSECTICIDE DUSTER

[76] Inventor: Norman L. Farmer, Rte. 1, Box 280, Abbeville, S.C. 29620

[21] Appl. No.: 429,075

[22] Filed: Sep. 30, 1982

[51] Int. Cl.³ .............................................. A01C 7/02
[52] U.S. Cl. ................................................... 239/652
[58] Field of Search ................................. 239/652, 653

[56] References Cited

U.S. PATENT DOCUMENTS

| 125,324 | 4/1872 | Paine | 239/652 |
|---|---|---|---|
| 130,507 | 8/1872 | Keeney | 239/652 |
| 160,733 | 3/1875 | Walker et al. | 239/652 |
| 1,602,977 | 10/1926 | Horn | 239/652 |
| 3,279,657 | 10/1966 | Rousselet | 239/652 |

FOREIGN PATENT DOCUMENTS 588570  11/1924  France ................................. 239/652

Primary Examiner—Jeffrey V. Nase
Attorney, Agent, or Firm—Dority & Manning

[57] ABSTRACT

An insecticide duster for plants including an elongated plastic tubing having a loosely woven bag-like member carried adjacent a lower end thereof. The bag-like member is stiff and projects directly outwardly from the end of the tube as a result of being constructed of loosely woven polyester material that is coated with a vinyl material. This enables the duster to be held in a horizontal position when dusting plants. When not in use, the bag is tucked back into the housing and caps inserted thereon.

3 Claims, 4 Drawing Figures

INSECTICIDE DUSTER

BACKGROUND OF THE INVENTION

One type of duster utilized heretofore includes a tubular housing in which a pesticide in the form of dust is carried. These dusters normally have perforated holes in the cap provided thereon so that the dust can be deposited on the plants or animals by shaking the duster up and down in a vertical manner. As long as the dust provided in the duster is very dry, these type of dusters tend to work satisfactorily, however, as the dust absorbs moisture, it tends to collect together restricting the discharge.

Duster cans in the forms of sifters have been utilized, and one particular device is disclosed in U.S. Pat. No. 3,279,657. In this particular device, the dust is placed within a sack carried within the can. By shaking the can up and down, the dust passes through the bag. One problem with such a device is that as the dust absorbs moisture, it tends to stick to the porous burlap material from which the bag is made. As a result, it is difficult to produce a uniform flow of dust therefrom.

Other types of sifters are disclosed in U.S. Pat. Nos. 1,087,727, 2,014,789, 2,618,883, 1,476,655 and 3,613,680.

SUMMARY OF THE INVENTION

This invention relates to an insecticide duster for plants which includes an elongated plastic housing constructed of PVC material. A loosely woven bag is carried adjacent a lower end of the tubular member. The bag-like member is woven of polyester yarn coated with vinyl material for imparting stiffness to the bag-like material. The bag-like member is secured adjacent the lower end of the tubular housing by means of a plastic collar. The open end of the bag-like member is sandwiched between the plastic collar and an inner wall of the tubular member and is secured thereby by any suitable adhesive. When in use, as a result of the stiffness of the bag-like member, it extends out beyond the end of the tubular member. As a result, the dust or insecticide can be readily dispensed from the tubular member by merely holding the tubular member in a substantially horizontal position and shaking. Since the bag-like member is loosely woven and constructed of synthetic material, it does not absorb moisture and retains its open configuration even if the duster with the powder stored therein is stored for a period of time.

When the duster is not being used, the bag-like member is tucked back through the plastic collar into the tubular member and caps are placed on each end of the tubular member for preventing moisture from entering therein. Of course, a cap is provided on the top of the tubular member at all times during the dusting.

Accordingly, it is an important object of the present invention to provide a simple and efficient duster for insecticides.

Another important object of the present invention is to provide an insecticide duster that has a long life and is not susceptible to deterioration as a result of moisture and chemicals used therein.

Still another important object of the present invention is to provide a simple and inexpensive pesticide duster.

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The insecticide duster constructed in accordance with the present invention includes an elongated tubular body 10 constructed of any suitable material such as generally referred to as PVC material. This polyvinyl chloride plastic material is not affected by insecticides and fertilizer. The tubular member 10 is rigid and has open upper and lower ends upon which caps 12 are press-fitted. The caps may be constructed of any suitable plastic material which, when inserted over the end of the tubular member, provides a snug sealed fit.

A loosely woven bag is carried in the lower end of the tubular member. In one particular embodiment, the bag is a woven polyester material that is coated with vinyl so as to produce a stiff bag. This ensures that the openings in the weave remain open for sifting of the insecticide therethrough. Furthermore, as a result of the bag-like member being constructed of a woven polyester material coated with vinyl material, the life of the bag is substantially extended over a normal fabric since the insecticide does not have a deteriorating effect thereon.

Figure 2:
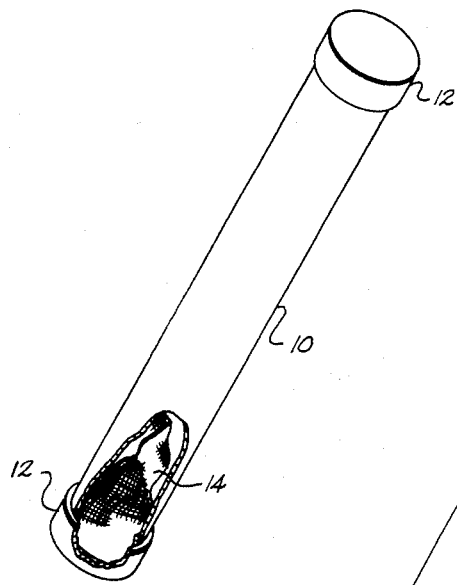
FIG. 2 shows an insecticide duster constructed in accordance with the present invention in a stored condition.
Figure 3:
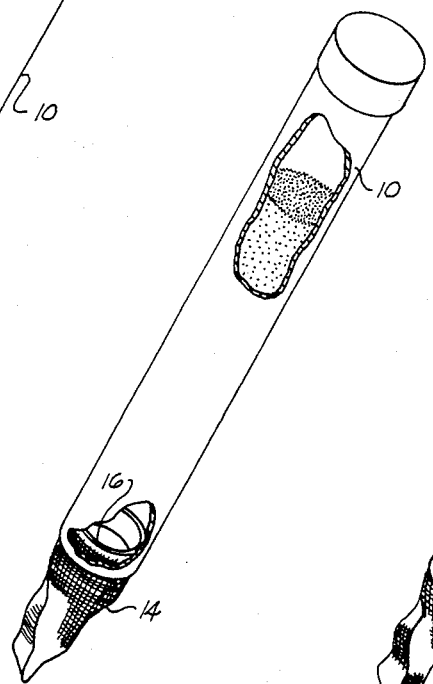
FIG. 3 is a perspective view illustrating the duster with a bag-like member extending out of the end thereof in a dusting position.

The upper end of the bag-like member is open and is sandwiched between a tubular collar 16 and the inner wall adjacent the lower end of the tubular member 10. It is secured therein by any suitable adhesive. As a result, the top of the bag-like member is always maintained in open position whereas the lower end is closed. The collar 16 also permits the bag-like member 14 to be tucked back up into the tubular member as shown in FIG. 2 when not in use and a cap 12 inserted on the end of the tubular member.

Figure 1:
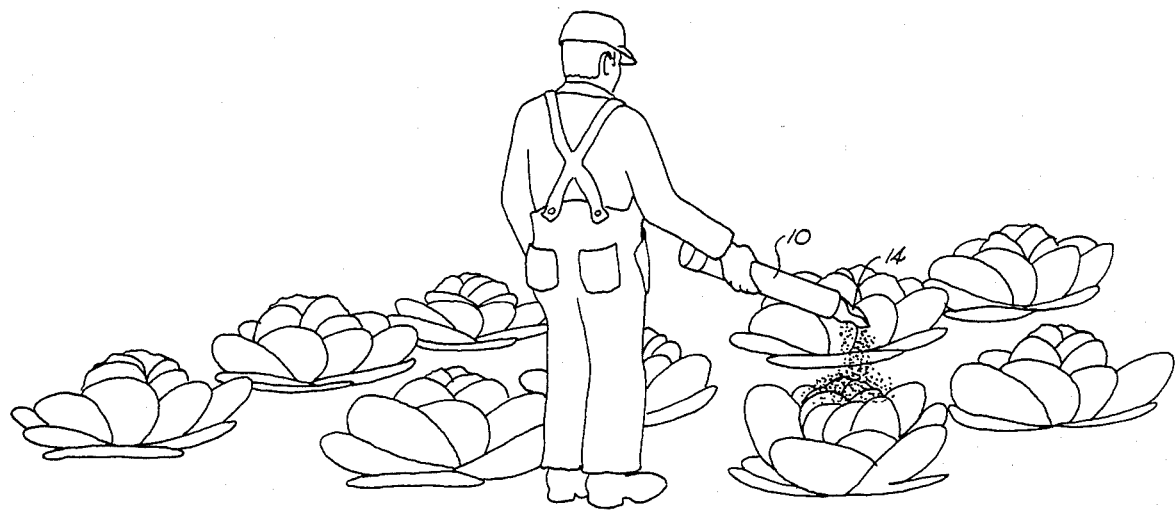
FIG. 1 is a perspective view illustrating a duster constructed in accordance with the present invention in use.

The vinyl coating of the polyester fabric provides sufficient stiffness to the bag-like member so that when the duster is held in a substantially horizontal position such as shown in FIG. 1 for dusting plants, the bag-like member 14 extends beyond the end of the tubular housing. As a result, there is a much better flow of insecticide through the fabric. In the prior art devices, normally the bag-like member was constructed of a flexible fabric and, as a result, the cans had to be shaken vertically up and down for dispensing the insecticide therefrom. Such is not nearly an effective method of dispensing the insecticide as is the case where the duster is held substantially horizontal. The stiffness of the bag permits horizontal holding of the duster during the dusting operation.

Figure 4:
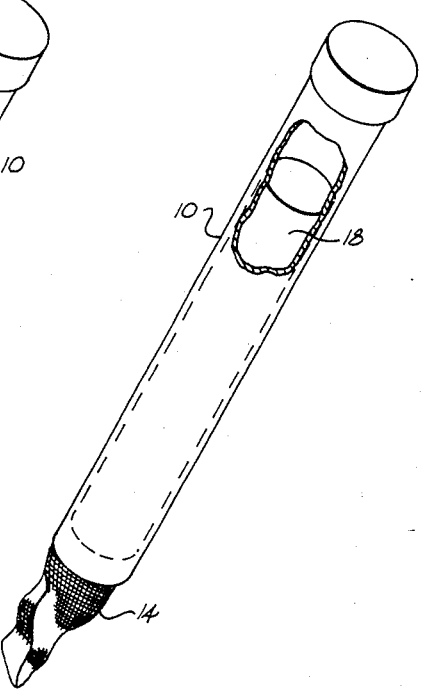
FIG. 4 is a modified form of the invention.

In FIG. 4, there is shown cartridge 18 loaded in the tubular housing 10 which contains the insecticide. As a result, the end of the cartridge 18 is merely removed and the cartridge 18 is loaded into the tubular housing for dispensing the insecticide therefrom.

While a preferred embodiment of the invention has been described using specific terms, such description is for illustrative purpose only, and it is to be understood that changes and variations may be made without departing from the spirit or scope of the following claims.

What is claimed is:

1. An insecticide duster for dusting plants with an insecticide comprising:
   an elongated plastic tubular member;
   a woven bag-like member carried adjacent a lower end of said tubular member;
   means for securing an open-end of said bag-like member adjacent said lower end of said tubular member;
   said bag-like member being a loosely woven synthetic fabric, a vinyl coating provided on said fabric adding sufficient stiffness to said bag-like member causing said bag-like member to extend substantially straight out from said lower end of said tubular member when said tubular member is held in a substantially horizontal position and to be tucked in said tubular member when not in use, and sealing caps placed over the ends of said tubular member for storing said insecticide.

2. An insecticide duster for plants comprising:
   an elongated plastic tubular member;
   a loosely woven bag-like member carried adjacent a lower end of said tubular member;
   said bag-like member being woven of polyester yarn coated with vinyl material for imparting sufficient stiffness to said bag-like member causing said bag-like member to extend substantially straight out from said lower end of said tubular member when said tubular member is held in a substantially horizontal position;
   means for securing an open end of said bag-like member adjacent said lower end of said tubular member permitting said bag-like member to project beyond said lower end of said tubular member when being used as a duster and tucked into said tubular member when not being used, and
   caps for being placed over the end of said tubular member.

3. The insecticide duster for plants as set forth in claim 2 further comprising:
   a plastic collar carried in the lower end of said tubular member;
   said open end of said bag-like member being sandwiched between said plastic collar and an inner wall of said tubular member for holding said open end of said bag-like member in an open position while permitting the bag-like member to be tucked back through said collar into said tubular member when not in use.

* * * * *